(12) United States Patent
Suzuki et al.

(10) Patent No.: US 11,557,953 B2
(45) Date of Patent: Jan. 17, 2023

(54) LOW HEIGHT TYPE ACTUATOR CAPABLE OF PERFORMING A TWO-DIMENSION MOTION

(71) Applicants: TDK CORPORATION, Tokyo (JP); TOKYO INSTITUTE OF TECHNOLOGY, Tokyo (JP)

(72) Inventors: Kenichi Suzuki, Tokyo (JP); Tadahiko Shinshi, Tokyo (JP); Ryogen Fujiwara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1213 days.

(21) Appl. No.: 16/071,366

(22) PCT Filed: Jan. 19, 2017

(86) PCT No.: PCT/JP2017/001648
§ 371 (c)(1),
(2) Date: Jul. 19, 2018

(87) PCT Pub. No.: WO2017/126577
PCT Pub. Date: Jul. 27, 2017

(65) Prior Publication Data
US 2021/0175788 A1    Jun. 10, 2021

(30) Foreign Application Priority Data

Jan. 22, 2016 (JP) .............................. JP2016-010322

(51) Int. Cl.
*H02K 41/02* (2006.01)
*H02K 41/03* (2006.01)
(Continued)

(52) U.S. Cl.
CPC ......... *H02K 41/031* (2013.01); *G02B 27/646* (2013.01); *G03B 5/00* (2013.01); *G03B 2205/0007* (2013.01); *H02K 2201/18* (2013.01)

(58) Field of Classification Search
CPC ........ H02K 1/00; H02K 21/00; H02K 41/031; H02K 99/20; H02K 1/06; G03B 5/00; G03B 2205/007; G03B 3/00; G03B 2205/0069
See application file for complete search history.

(56) References Cited

U.S. PATENT DOCUMENTS 6,239,516 B1    5/2001  Floresta et al.
7,742,691 B2 *  6/2010  Takahashi ............ G02B 27/646
                                                    396/55
(Continued)

FOREIGN PATENT DOCUMENTS

JP    11196560 H    7/1999
JP    11299216 H    10/1999
(Continued)

OTHER PUBLICATIONS

Machine Translation of WO 2017025137 A1 (Year: 2017).*
(Continued)

*Primary Examiner* — Quyen P Leung
*Assistant Examiner* — Christopher S Leone
(74) *Attorney, Agent, or Firm* — Young Law Firm, P.C.

(57) ABSTRACT

A low height type actuator capable of performing a two-dimensional motion includes a magnet structure that includes a first array in which the first and second magnets are alternately arranged in x-direction and a second array in which the first and second magnets are alternately arranged in y-direction, and first and second wirings. The first wiring crosses the first magnets included in the first array in
(Continued)

y-direction, and the second wiring crosses the first magnets included in the second array in x-direction. According to the present invention, by making current flow in the first and second wirings, a two-dimensional motion can be achieved. Further, since the first and second wirings are each a planar wiring that crosses the magnets, height reduction can be achieved.

16 Claims, 12 Drawing Sheets

(51) Int. Cl.
    *G02B 27/64*     (2006.01)
    *G03B 5/00*     (2021.01)

(56) References Cited

U.S. PATENT DOCUMENTS

| | | | | |
|---|---|---|---|---|
| 8,324,998 | B2* | 12/2012 | Takahashi | H02K 35/02 |
| | | | | 310/15 |
| 9,685,849 | B2* | 6/2017 | Lu | H02K 41/031 |
| 2005/0007228 | A1* | 1/2005 | Wright | H01F 7/1646 |
| | | | | 335/220 |
| 2008/0296984 | A1* | 12/2008 | Honma | H02K 35/02 |
| | | | | 310/17 |
| 2009/0284091 | A1* | 11/2009 | Lacour | H02K 49/065 |
| | | | | 464/29 |

FOREIGN PATENT DOCUMENTS

| | | | | |
|---|---|---|---|---|
| JP | 2015163004 A | | 9/2015 | |
| WO | WO-2013090123 A1 * | | 6/2013 | ......... G03F 7/70758 |
| WO | WO-2017025137 A1 * | | 2/2017 | ............ B65G 54/02 |

OTHER PUBLICATIONS

Multi-Pole Magnetization of Thin Film Neodymium Permanent Magnet and Fabrication of a MEMS Linear Motor Using the Magnetized Magnet, The Japan Society for Precision Engineering, vol. 79 Issue 8 pp. 773-778, Aug. 2013.
WO2017/126577A1 with International Search Report in PCT/JP2017/001648 dated Jul. 27, 2017.

* cited by examiner

LOW HEIGHT TYPE ACTUATOR CAPABLE OF PERFORMING A TWO-DIMENSION MOTION

TECHNICAL FIELD

The present invention relates to an actuator and, more particularly, to an actuator capable of performing a two-dimensional motion.

BACKGROUND ART

While actuators capable of reciprocating in one axis direction are commonly used as actuators using electromagnetic force, Patent Document 1 describes an actuator allowing a two-dimensional motion by arranging magnets in a matrix. The actuator described in Patent Document 1 allocates four coils to one magnet and controls the direction of current made to flow in the coils to thereby achieve the two-dimensional motion.

CITATION LIST

Patent Document

[Patent Document 1] JP 11-196560 A

Non-Patent Document

[Non-Patent Document 1] Multi-pole Magnetization of Thin Film Neodymium Permanent Magnet and Fabrication of a MEMS Linear Motor Using the Magnetized Magnet (Journal of the Japan Society for Precision Engineering, Vol. 79, No. 8, 2013, p 773 to p 778)

SUMMARY OF INVENTION

Technical Problem to be Solved by Invention

However, since four coils are allocated to one magnet in the actuator described in Patent Document 1, miniaturization of the actuator is difficult to achieve. Particularly, it is difficult to reduce the size of the actuator in the thickness direction perpendicular to the drive surface thereof. Thus, the actuator having such a configuration is not suitable for devices, such as mobile type devices, requiring a reduced height.

As an actuator whose height can be reduced, there is known a linear motor described in Non-Patent Document 1. However, the linear motor described in Non-Patent Document 1 can reciprocate only in one axial direction and cannot perform a two-dimensional motion.

The object of the present invention is therefore to provide a low height type actuator capable of performing a two-dimensional motion.

Means for Solving Problem

An actuator according to the present invention includes: a magnet structure including: a plurality of first magnets each having an N-pole magnetic pole face positioned at a first plane extending in a first direction and a second direction perpendicular to the first direction and a plurality of second magnets each having an S-pole magnetic pole face positioned at the first plane; a first wiring provided on a second plane parallel to the first plane; and a second wiring provided on a third plane parallel to the first plane. The magnet structure includes: a first array in which the first and second magnets are alternately arranged in the first direction; and a second array in which the first and second magnets are alternately arranged in the second direction. The first wiring crosses in the second direction at least some of the first and second magnets included in the first array, and the second wiring crosses in the first direction at least some of the first and second magnets included in the second array.

According to the present invention, by making current flow in the first and second wirings, a two-dimensional motion can be achieved. Further, since the first and second wirings are each a planar wiring that crosses the magnets, height reduction can be achieved.

In the present invention, the first wiring preferably includes a first wiring part that crosses the first magnets in the second direction and a second wiring part that crosses the second magnets in the second direction. The second wiring preferably includes a third wiring part that crosses the first magnets in the first direction and a fourth wiring part that crosses the second magnets in the first direction. The first and second wiring parts are configured to flow current in opposite directions, and the third and fourth wiring parts are configured to flow current in opposite directions. This allows a larger drive force to be obtained.

In the present invention, the first and second magnets are preferably arranged in a matrix in the first and second directions. This allows the first and second arrays to have a common configuration.

In the present invention, the second and third planes may overlap each other. This allows the planer size of the actuator to be reduced. Alternatively, the second and third planes may be coplanar. This can make a wiring layer into a single-layer structure.

In the present invention, the first wiring is preferably formed into a meander shape on the second plane, and the second wiring is preferably formed into a meander shape on the third plane. This allows the first and second wirings to cross more magnets, thereby making it possible to obtain a larger drive force.

The actuator according to the present invention preferably further includes a third wiring provided on a fourth plane parallel to the first plane, and the third wiring preferably includes a fifth wiring part circling around at least a part of the periphery of the first magnet in a plan view. Thus, by making current flow in the first to third wirings, a three-dimensional motion can be achieved.

In this case, the third wiring preferably includes a sixth wiring part circling around at least a part of a periphery of the second magnet in a plan view, and the fifth and sixth wiring parts are configured to flow current in opposite circling directions. This allows a larger drive force to be obtained.

In the present invention, the sizes of each of the first and second magnets in the first and second directions are preferably equal to or smaller than 1 mm, and the thickness of the magnet structure in the third direction perpendicular to the first and second directions is preferably equal to or smaller than 1 mm. This allows an actuator of a small size and low height to be provided.

The actuator according to the present invention preferably further includes a support substrate supporting the magnet structure, and the thermal diffusivity of the support substrate is preferably lower than that of the magnet structure. This facilitates manufacture of a small and thin magnet structure.

The actuator according to the present invention preferably further includes an optical lens and a circuit board supporting the first and second wirings, and the optical lens is preferably fixed to one of the circuit board and magnet structure. This allows the actuator to be used as a camera shaking correction actuator.

Advantageous Effect of Invention

As described above, according to the present invention, there can be provided a low height type actuator capable of performing a two-dimensional motion.

MODE FOR CARRYING OUT THE INVENTION

Preferred embodiments of the present invention will now be explained in detail with reference to the drawings.

First Embodiment

Figure 1:
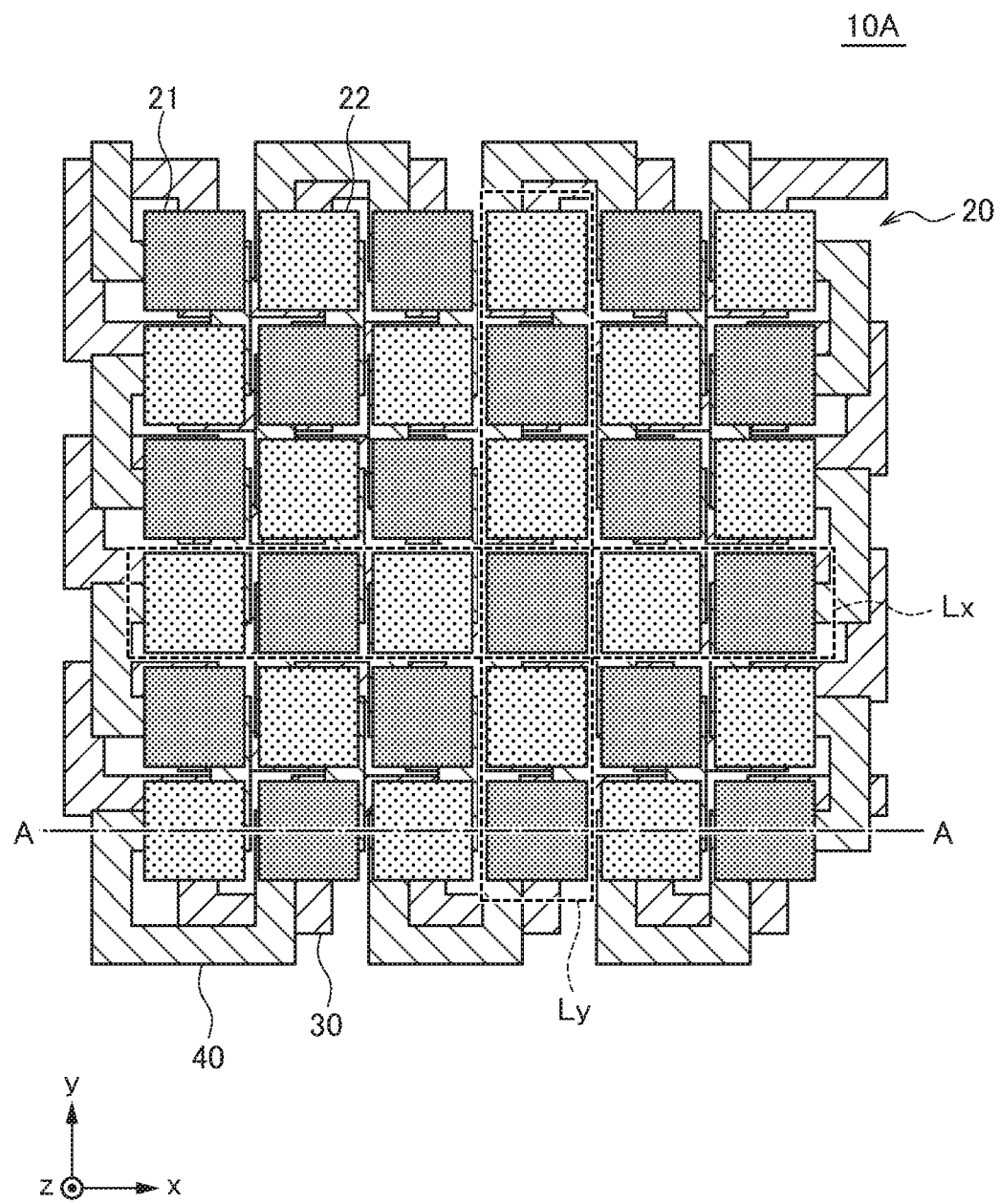
FIG. 1 is a schematic plan view illustrating the configuration of the main part of an actuator 10A according to a first embodiment of the present invention.
Figure 2:
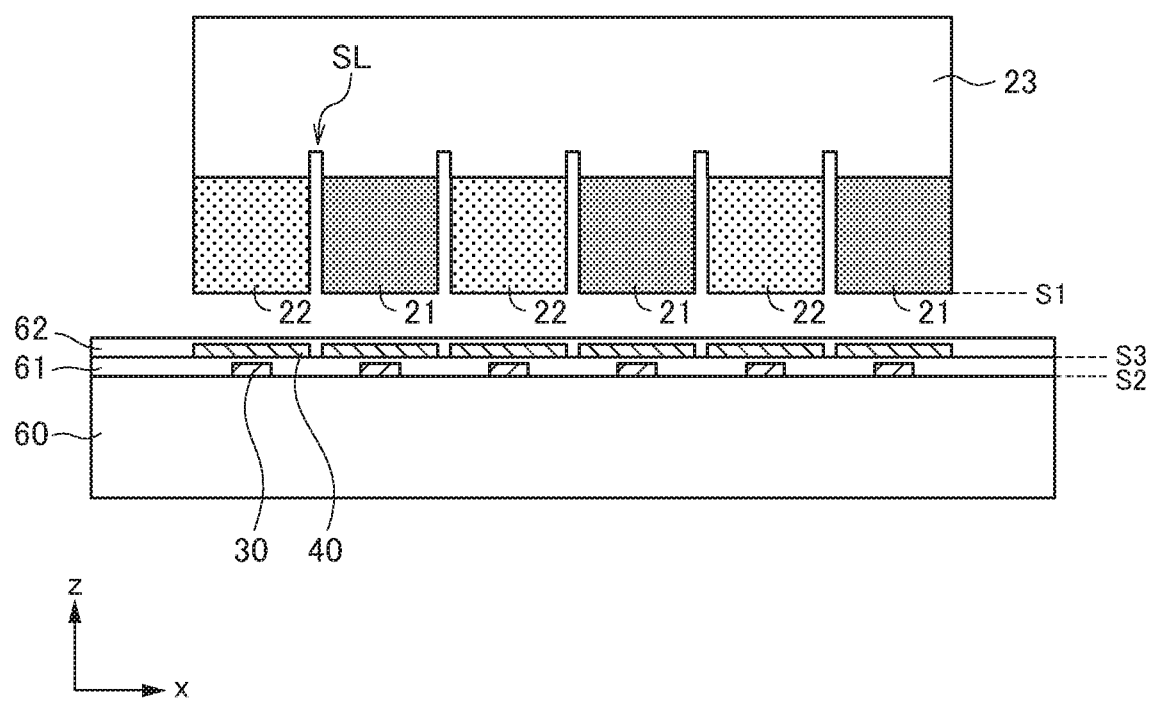
FIG. 2 is a schematic cross-sectional view taken along line A-A of FIG. 1.

FIG. 1 is a schematic plan view illustrating the configuration of the main part of an actuator 10A according to the first embodiment of the present invention. FIG. 2 is a schematic cross-sectional view taken along line A-A of FIG. 1.

As illustrated in FIGS. 1 and 2, the actuator 10A according to the present embodiment has a magnet structure 20 including a plurality of first and second magnets 21 and 22 arranged in a matrix in the x- and y-directions and first and second wirings 30 and 40 overlapping the magnet structure 20 in the z-direction.

The magnet structure 20 is formed on a support substrate 23 made of, e.g., glass, and a magnetic pole face thereof is positioned at a first plane S1 extending in the xy direction. In FIG. 1, the support substrate 23 is omitted for easy viewing. The magnet structure 20 is constituted of the first and second magnets 21 and 22, and the magnetic pole face of the first magnet 21 positioned at the first plane assumes an N-pole and, conversely, the magnetic pole face of the second magnet 22 positioned at the first plane assumes an S-pole. The first and second magnets 21 and 22 are arranged in a matrix to form a checkered pattern. That is, each row extending in the x-direction constitutes a first array Lx including the first magnets 21 and second magnets 22 alternately arranged in the x-direction, and each column extending in the y-direction constitutes a second array Ly including the first magnets 21 and second magnets 22 alternately arranged in the y-direction.

As illustrated in FIG. 2, in the present embodiment, adjacent first and second magnets 21 and 22 are isolated through a slit SL, and the slit SL reaches the surface layer of the support substrate 23. The existence of the slit SL is optional in the present embodiment; however, as will be described later, it is advantageous to form the slit SL in a manufacturing process of the magnet structure 20. If the slit SL is not formed, the support substrate 23 need not necessarily be provided.

The first and second wirings 30 and 40 are laminated on a circuit board 60. The main surface of the circuit board 60 constitutes a second plane S2 parallel to the first plane S1, and the first wiring 30 is formed on the main surface of the circuit board 60, i.e., on the second plane S2. The first wiring 30 is covered with an insulating film 61. The surface of the insulating film 61 constitutes a third plane S3 parallel to the first plane S1. The second wiring 40 is formed on the surface of the insulating film 61, i.e., on the third plane S3. The second wiring 40 is covered with an insulating film 62. As described above, the first and second wirings 30 and 40 are laminated over the circuit board 60 so as to overlap each other in the z-direction.

Figure 3:
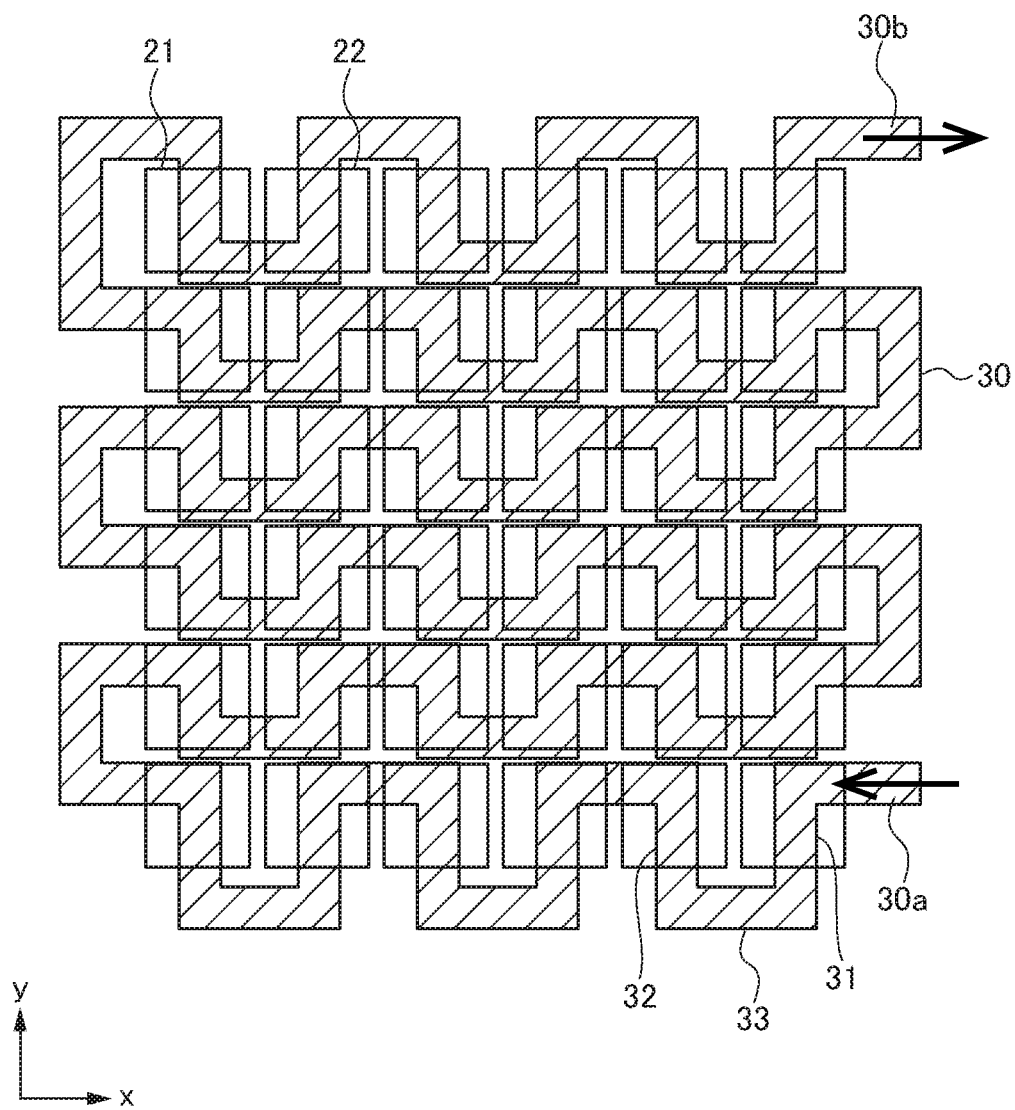
FIG. 3 is a plan view of the first wiring 30.

FIG. 3 is a plan view focusing on the first wiring 30. In FIG. 3, the positions of the first and second magnets 21 and 22 are also shown so as to make the positional relationship between the first wiring 30 and the magnet structure 20 clear. The same applies to the following FIGS. 4 to 6 and FIGS. 10 and 11.

As illustrated in FIG. 3, the first wiring 30 is a single unicursal wiring and has a planar shape extending in a meandering manner. More specifically, the first wiring 30 includes a first wiring part 31 that crosses the first magnet 21 in the y-direction, a second wiring part 32 that crosses the second magnet 22 in the y-direction, and a connecting part 33 that extends in the x-direction so as to connect the first wiring part 31 and the second wiring part 32.

Thus, when current is made to flow in the first wiring 30, the directions of the current flowing in the first wiring part 31 and second wiring part 32 become opposite to each other. In the example of FIG. 3, when current is made to flow from one end 30a of the first wiring 30 to the other end 30b thereof, the current flows downward (in the negative y-direction) in the first wiring part 31, whereas the current flows upward (in the positive y-direction) in the second wiring part 32.

Figure 4:
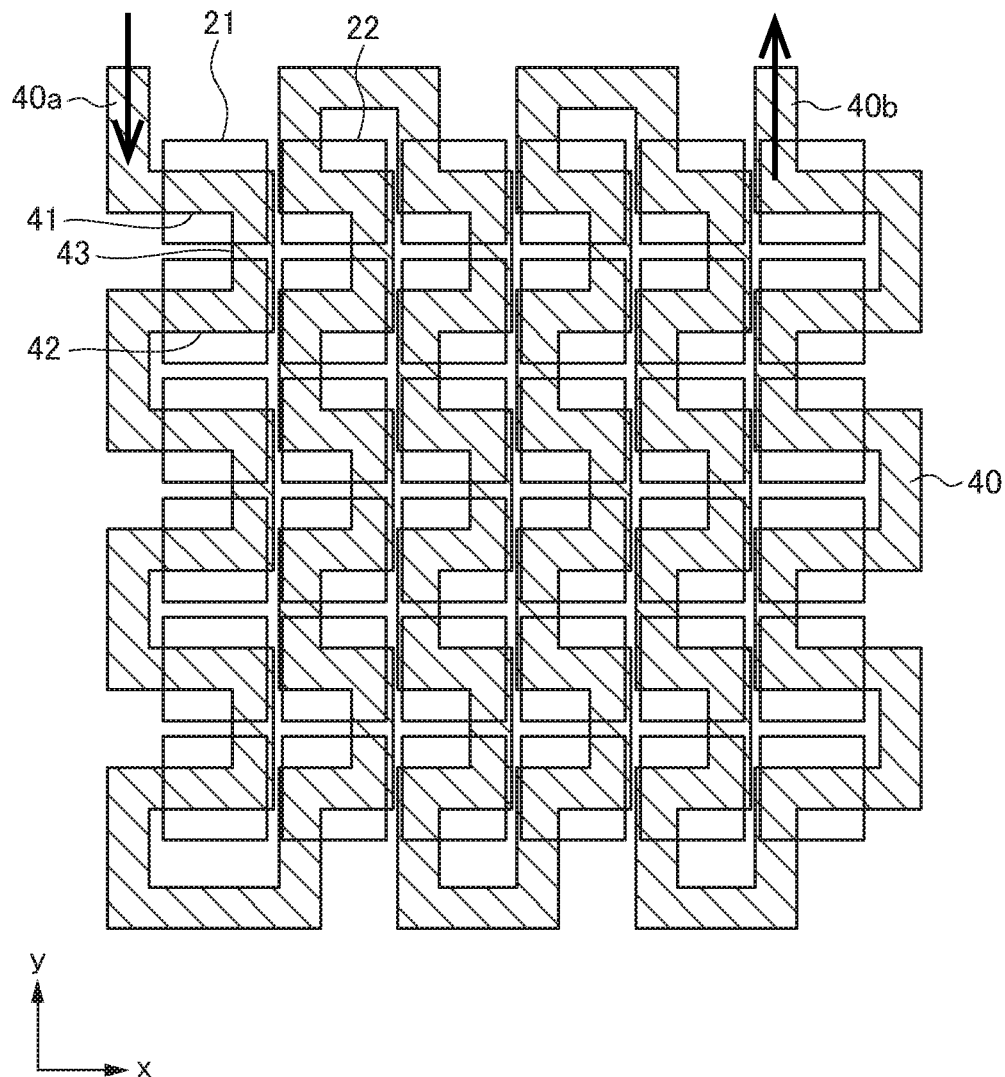
FIG. 4 is a plan view of the second wiring 40.

FIG. 4 is a plan view focusing on the second wiring 40.

As illustrated in FIG. 4, the second wiring 40 is a single unicursal wiring and has a planar shape extending in a meandering manner. More specifically, the second wiring 40 includes a third wiring part 41 that crosses the first magnets 21 in the x-direction, a fourth wiring part 42 that crosses the second magnets 22 in the x-direction, and a connecting part 43 that extends in the y-direction so as to connect the third wiring part 41 and the fourth wiring part 42.

Thus, when current is made to flow in the second wiring 40, the directions of the current flowing in the third wiring part 41 and fourth wiring part 42 become opposite to each other. In the example of FIG. 4, when current is made to flow from one end 40a of the second wiring 40 to the other end 40b thereof, the current flows in the third wiring part 41 rightward (in the positive x-direction), and the current flows in the fourth wiring part 42 leftward (in the negative x-direction).

Figure 5:
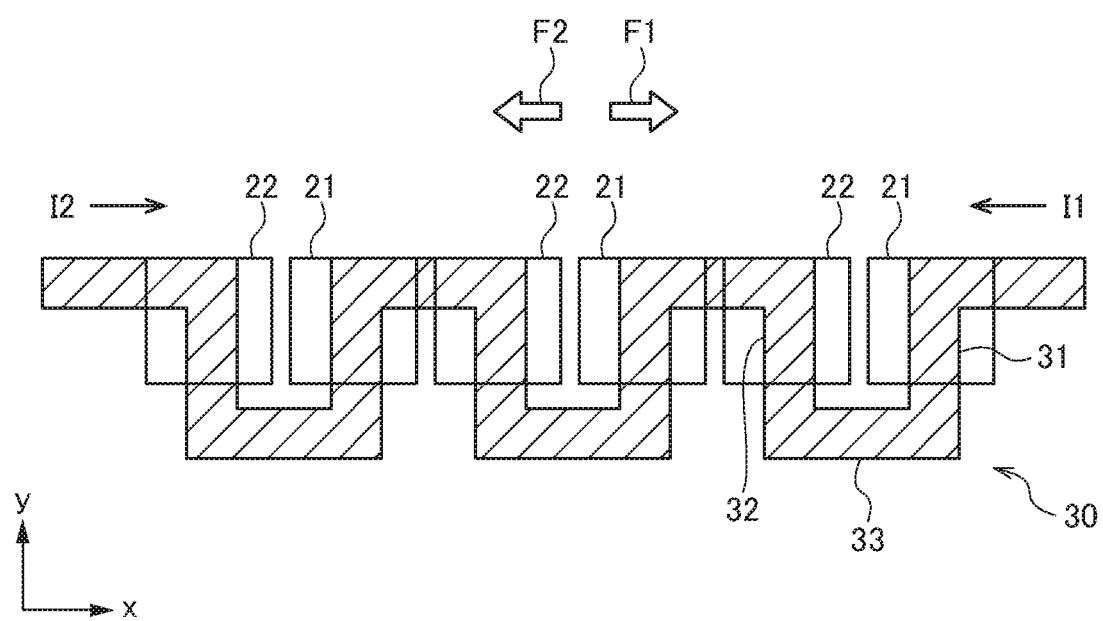
FIG. 5 is a diagram for explaining influence that current flowing in the first wiring 30 has on the magnet structure 20.

FIG. 5 is a diagram for explaining influence that current flowing in the first wiring 30 has on the magnet structure 20.

As illustrated in FIG. 5, when a current I1 or I2 flows in the first wiring 30, the x-direction Lorentz force F1 or F2 acts between the magnet structure 20 and the first wiring 30.

Specifically, when the current I1 flows in the first wiring 30, the current flows downward (in the negative y-direction) with respect to the first magnet 21, so that the rightward (positive x-direction) Lorentz force F1 acts on the first wiring 30, whereas the current flows upward (in the positive y-direction) with respect to the second magnet 22, so that the rightward (positive x-direction) Lorentz force F1 acts on the first wiring 30. Thus, the rightward (positive x-direction) Lorentz force F1 acts on the first wiring 30 with respect to both the first and second magnets 21 and 22.

On the other hand, when the current I2 flows in the first wiring 30, the current flows upward (in the positive y-direction) with respect to the first magnet 21, so that the leftward (negative x-direction) Lorentz force F2 acts on the first wiring 30, whereas the current flows downward (in the negative y-direction) with respect to the second magnet 22, so that the leftward (negative x-direction) Lorentz force F2 acts on the first wiring 30. Thus, the leftward (negative x-direction) Lorentz force F2 acts on the first wiring 30 with respect to both the first and second magnets 21 and 22.

Thus, by making the current I1 or I2 flow in the first wiring 30, it is possible to change the relative positional relationship between the magnet structure 20 and the first wiring 30 in the x-direction. The speed of the positional change can be controlled by the magnitude of the current I1 or I2.

Figure 6:
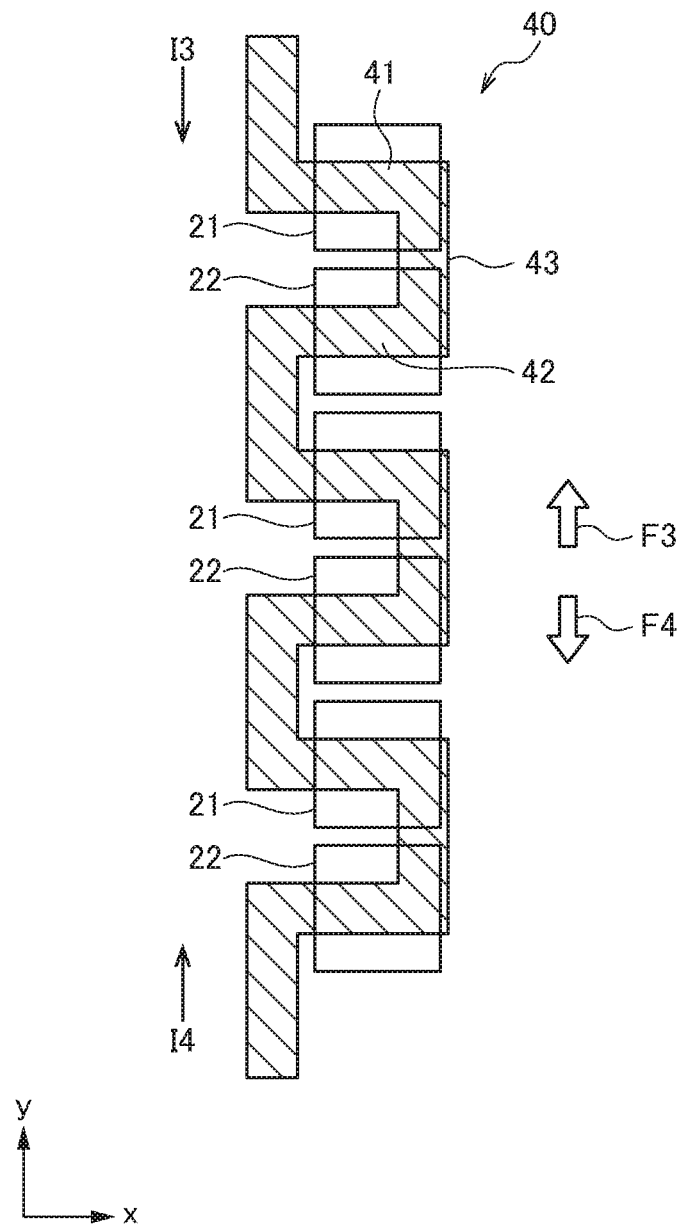
FIG. 6 is a diagram for explaining influence that current flowing in the second wiring 40 has on the magnet structure 20.

FIG. 6 is a diagram for explaining influence that current flowing in the second wiring 40 has on the magnet structure 20.

As illustrated in FIG. 6, when a current I3 or I4 flows in the second wiring 40, the y-direction Lorentz force F3 or F4 acts between the magnet structure 20 and the second wiring 40.

Specifically, when the current I3 flows in the second wiring 40, the current flows rightward (in the positive x-direction) with respect to the first magnet 21, so that the upward (positive y-direction) Lorentz force F3 acts on the second wiring 40, whereas the current flows leftward (in the negative x-direction) with respect to the second magnet 22, so that the upward (positive y-direction) Lorentz force F3 acts on the second wiring 40. Thus, the upward (positive y-direction) Lorentz force F3 acts on the second wiring 40 with respect to both the first and second magnets 21 and 22.

On the other hand, when the current I4 flows in the second wiring 40, the current flows leftward (in the negative x-direction) with respect to the first magnet 21, so that the downward (negative y-direction) Lorentz force F4 acts on the second wiring 40, whereas the current flows rightward (in the positive x-direction) with respect to the second magnet 22, so that the downward (negative y-direction) Lorentz force F4 acts on the second wiring 40. Thus, the downward (negative y-direction) Lorentz force F4 acts on the second wiring 40 with respect to both the first and second magnets 21 and 22.

Thus, by making the current I3 or I4 flow in the second wiring 40, it is possible to change the relative positional relationship between the magnet structure 20 and the second wiring 40 in the y-direction. The speed of the positional change can be controlled by the magnitude of the current I3 or I4.

Both the first and second wirings 30 and 40 are formed on the circuit board 60, so that the planar positional relationship between the magnet structure 20 and the circuit board 60 can be changed by the currents I1 to I4. Thus, when the circuit board 60 is fixed to a predetermined casing, the magnet structure 20 can be two-dimensionally driven by the currents I1 to I4. On the other hand, when the magnet structure 20 is fixed to a predetermined casing, the circuit board 60 can be two-dimensionally driven by the currents I1 to I4.

Although not particularly limited, the actuator 10A according to the present embodiment can be used as an actuator for shake correction of a camera incorporated in a smartphone. In this case, one of the magnet structure and circuit board 60 is fixed to the casing of the smartphone, the other one thereof is fixed to an optical lens of the camera, and a camera shake signal obtained by an acceleration sensor incorporated in the smartphone is converted into the currents I1 to I4, whereby the optical lens can be driven in a direction canceling the camera shake in accordance with the direction and magnitude of the camera shake.

FIGS. 7A to 7F are process views for explaining a manufacturing method for the magnet structure 20.

Figure 7A:
FIGS. 7A to 7F are process views for explaining a manufacturing method for the magnet structure 20.

As illustrated in FIG. 7A, a bulky magnet 20a is bonded to the support substrate 23 made of, e.g., glass. Although not particularly limited, an anisotropic sintered neodymium magnet is preferably used as the magnet 20a. The magnetism facilitating axis of the magnet 20a is the thickness direction (z-direction). The thickness of the magnet 20a is limited by a device in which the actuator 10A according to the present embodiment is incorporated. For example, in a case where the actuator 10A is used to drive an optical lens for shake correction of a camera incorporated in a smartphone, it is required to have a significantly reduced thickness and, accordingly, the thickness of the magnet 20a needs to be small. In such an application, the thickness of the magnet 20a is limited to equal to or smaller than 1 mm e.g., to about 500 µm. When the thickness of the magnet 20a is about 500 µm, the thickness of the support substrate 23 may be set to about 700 µm. However, the surface layer part of the magnet 20a is low in coercive force, so that when the anisotropic sintered neodymium magnet is used, it may be difficult to set the thickness of the magnet 20a to a value smaller than 200 µm.

Figure 7B:
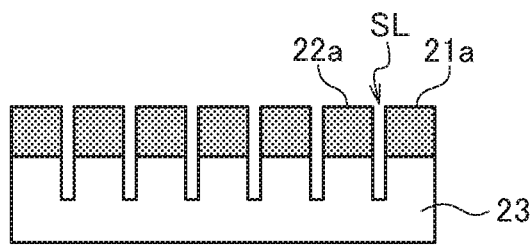

Then, as illustrated in FIG. 7B, the slits SL are formed in the magnet 20a to divide the magnet 20a into a plurality of blocks 21a and 22a which become the first and second magnets 21 and 22, respectively. The slit SL can be formed by using a dicing method, a wire discharge machining method, or the like. The slit SL is preferably formed to have a depth reaching the surface layer of the support substrate 23 so as to completely isolate the blocks 21a and 22a from each other. Although the blocks 21a and 22a are not particularly limited in size, they may have as small a size as possible in order to reduce influence of a diamagnetic field and thereby to obtain strong magnetic force. However, the surface layer part of the magnet 20a is low in coercive force as described above, so that when the magnet 20a is divided too finely, the coercive force is reduced. Considering this point, the size of each of the blocks 21a and 22a is preferably almost the same as the thickness of the magnet 20a. That is, the aspect ratio of each of the blocks 21a and 22a is preferably set to about 1. For example, when the thickness of the magnet 20a is about 500 µm, the blocks 21a and 22a may each be formed such that both the x-direction length and y-direction length thereof are set to 500 μm. As a result, the magnet 20a is divided into the blocks 21a and 22a each being a 500 μm×500 μm cube.

Figure 7C:
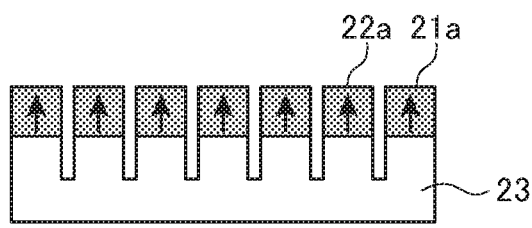

Then, as illustrated in FIG. 7C, the plurality of blocks 21a and 22a are magnetized in the z-direction. The magnetization is preferably carried out until the blocks 21a and 22a are magnetically saturated by application of a pulse magnetic field.

Figure 7D:
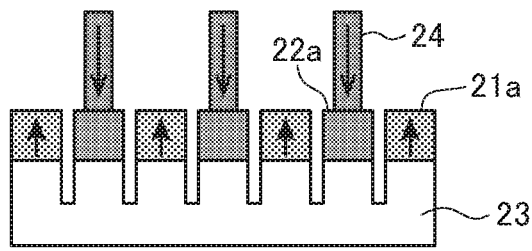

Then, as illustrated in FIG. 7D, the block 22a becoming the second magnet 22 is selectively irradiated with a laser beam 24 to be heated locally so that the coercive force of the block 22a is reduced. The heat given by the laser beam 24 is conducted to the block 21a that is supposed to become the first magnet 21 to some degree; however, it is less conducted in a planar direction due to existence of the slits SL. Further, by using a material, such as glass, having a thermal diffusivity lower than that of a sintered magnet, even heat conduction through the support substrate 23 can be minimized. Thus, it is possible to selectively reduce the coercive force of the block 22a while maintaining the coercive force of the block 21a.

Figure 7E:
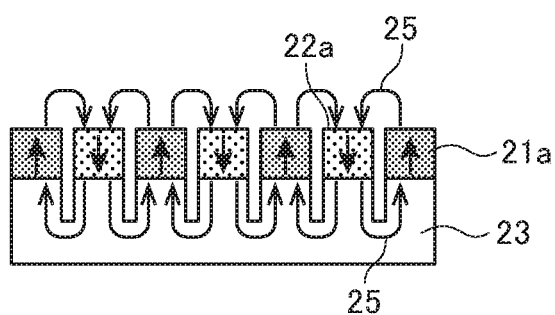
Figure 7F:
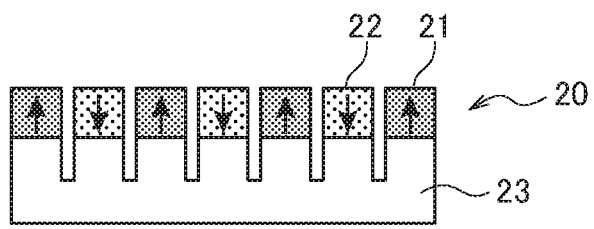

After natural cooling, a leakage magnetic flux from the block 21a passes the block 22a to magnetize the block 22a in the opposite direction, as illustrated in FIG. 7E. As a result, alternate magnetization is achieved and, thus, the magnet structure 20 in which the first and second magnets 21 and 22 are alternately arranged can be obtained as illustrated in FIG. 7F.

Then, the obtained magnet structure 20 and circuit board 60 are slidably supported in the planar direction such that the first plane S1 of the magnet structure 20 faces the second and third planes S2 and S3 of the circuit board 60, whereby the actuator 10A according to the present embodiment is completed.

As described above, the actuator 10A according to the present embodiment is constituted of the magnet structure 20 mounted on the support substrate 23 and first and second planar wirings 30 and 40 mounted on the circuit board 60. Thus, the actuator 10A can perform a two-dimensional motion with a very thin structure.

Second Embodiment

Figure 8:
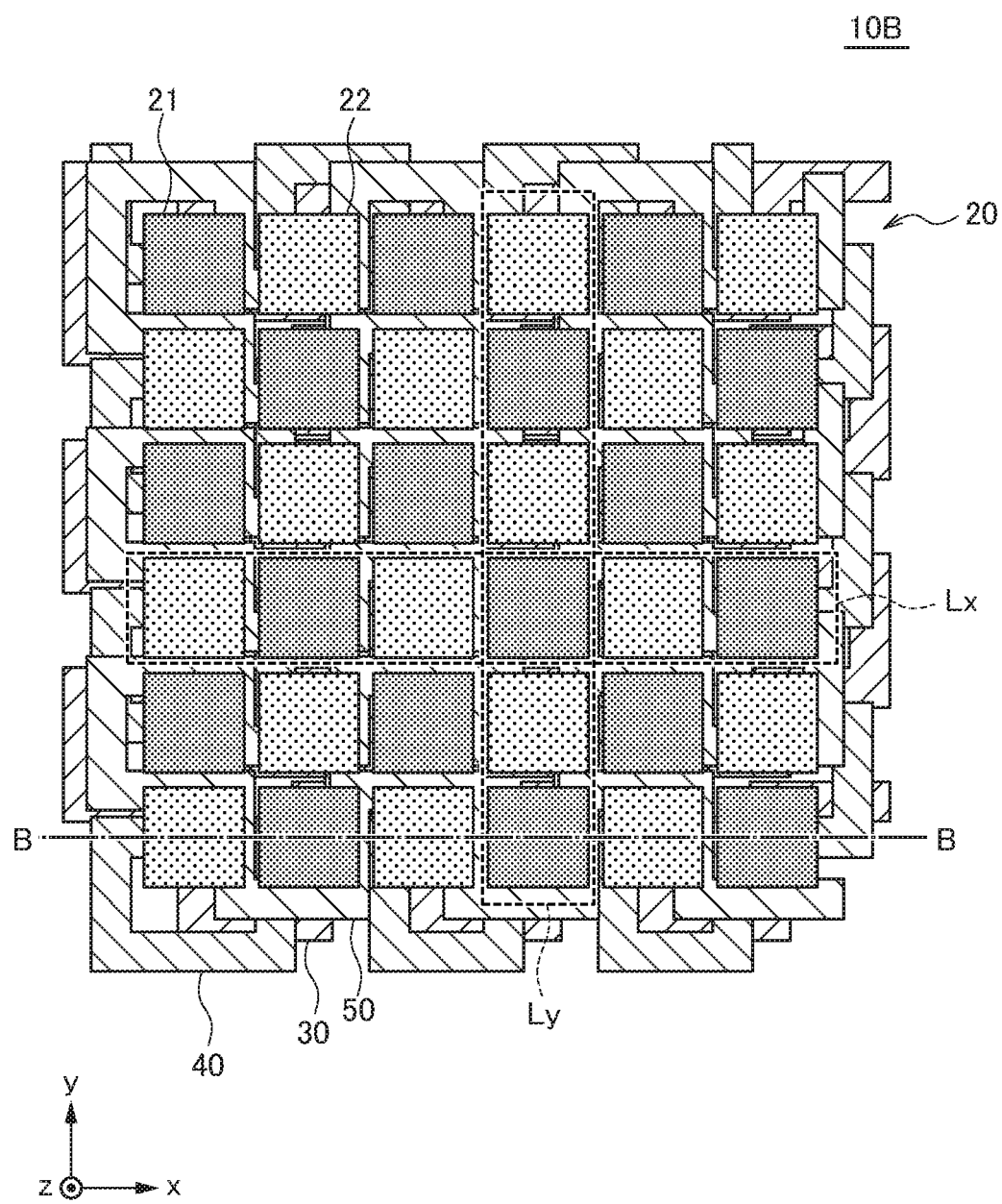
FIG. 8 is a schematic plan view illustrating the configuration of the main part of an actuator 10B according to a second embodiment of the present invention.
Figure 9:
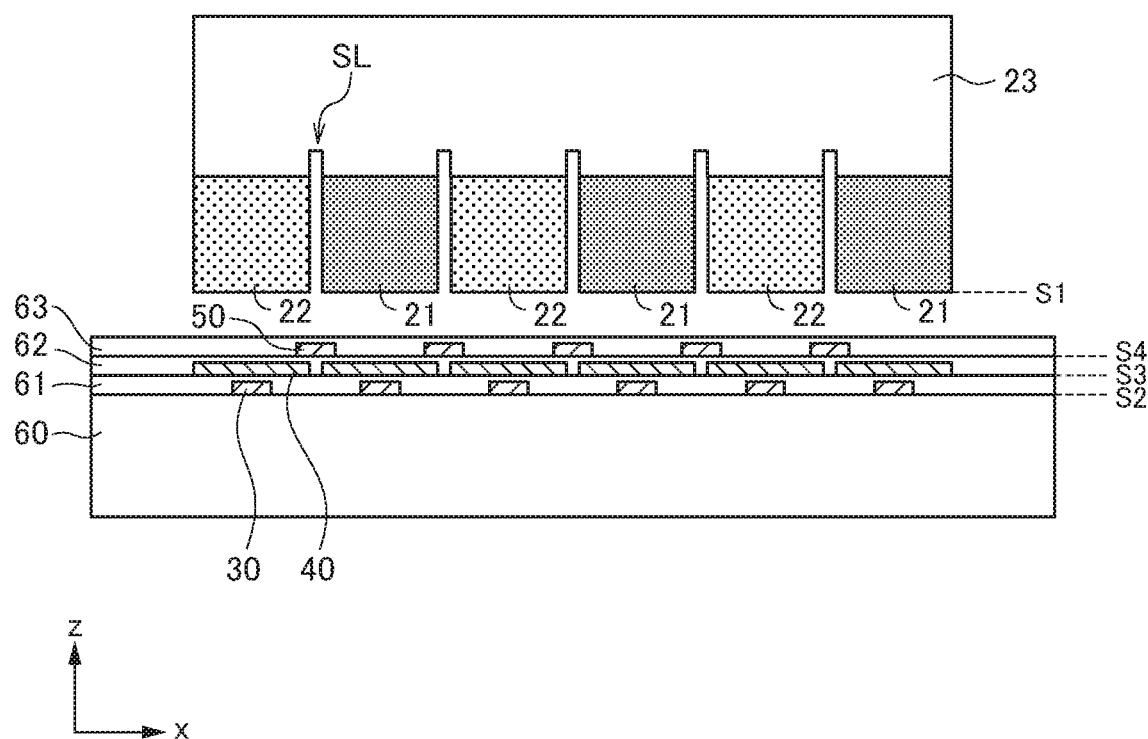
FIG. 9 is a schematic cross-sectional view taken along line B-B of FIG. 8.

FIG. 8 is a schematic plan view illustrating the configuration of the main part of an actuator 10B according to the second embodiment of the present invention. FIG. 9 is a schematic cross-sectional view taken along line B-B of FIG. 8.

As illustrated in FIGS. 8 and 9, the actuator 10B according to the present embodiment differs from the actuator 10A according to the first embodiment in that it further includes a third wiring 50 overlapping the magnet structure 20 in the z-direction. Other basic configurations are the same as those of the actuator 10A according to the first embodiment, so the same reference numerals are given to the same elements, and overlapping description will be omitted.

The third wiring 50 is laminated on the circuit board 60. Specifically, the surface of the insulating film 62 constitutes a fourth plane S4 parallel to the first plane S1, and the third wiring 50 is formed on the surface of the insulating film 62, i.e., on the fourth plane S4. The third wiring 50 is covered with an insulating film 63. Thus, the first to third wirings 30, 40, and 50 are laminated on the circuit board 60 so as to overlap each other in the z-direction.

Figure 10:
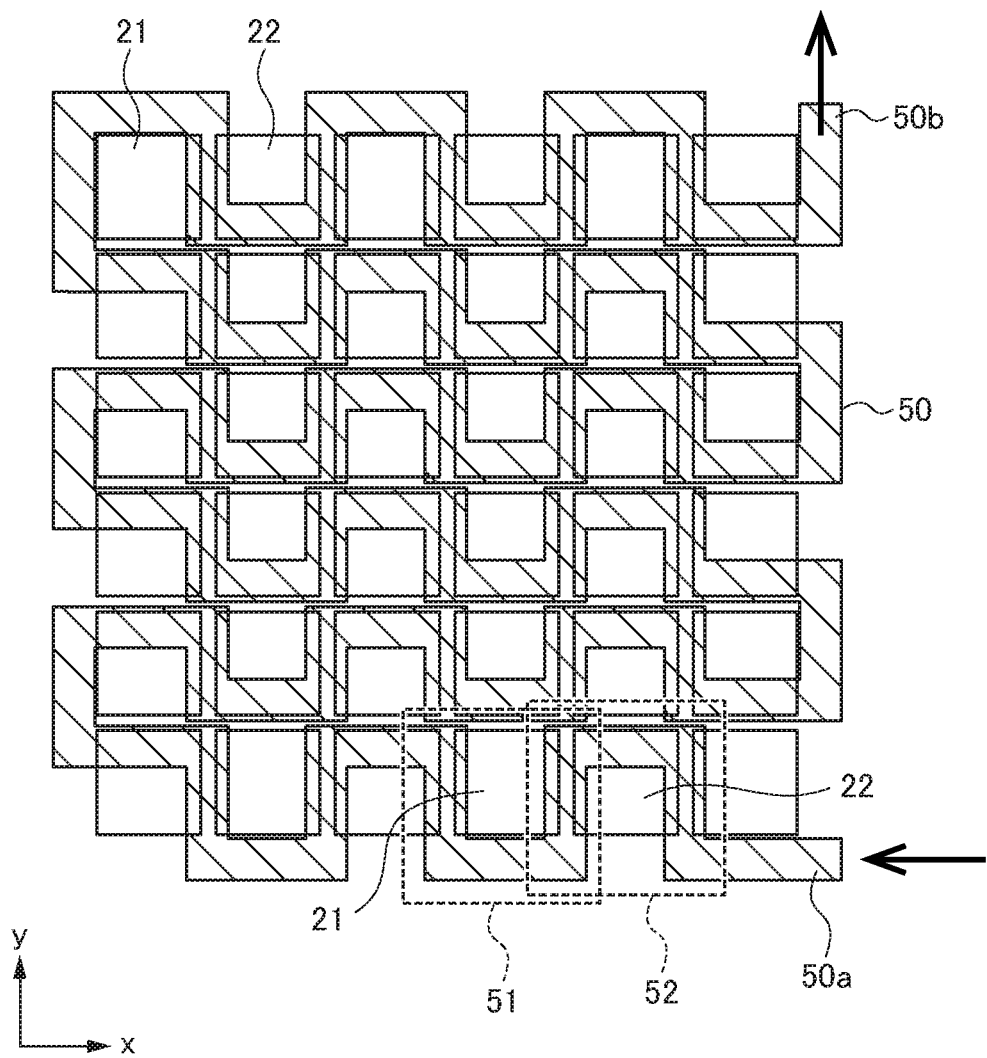
FIG. 10 is a plan view of the third wiring 50.

FIG. 10 is a plan view focusing on the third wiring 50.

As illustrated in FIG. 10, the third wiring 50 is a single unicursal wiring and has a planar shape extending in a meandering manner. More specifically, the third wiring 50 includes a fifth wiring part 51 that circles around a part of the periphery of the first magnet 21 in a plan view and a sixth wiring part 52 that circles around a part of the periphery of the second magnet 22 in a plan view. Since the third wiring 50 has a meander shape, it is difficult to make the third wiring 50 circle around the entire periphery of the first magnet 21 or second magnet 22. Thus, as illustrated in FIG. 10, the third wiring 50, in most cases, circles around the half of the entire periphery along two sides of the first magnet 21 or second magnet 22 or circles around three-quarters of the entire periphery along three sides thereof.

When current is made to flow in the third wiring 50, the directions of the current flowing in the fifth wiring part 51 and sixth wiring part 52 become opposite to each other. In the example of FIG. 10, when current is made to flow from one end 50a of the third wiring 50 to the other end 50b thereof, the current flows clockwise in the fifth wiring part 51, whereas the current flows counterclockwise in the sixth wiring part 52.

Figure 11:
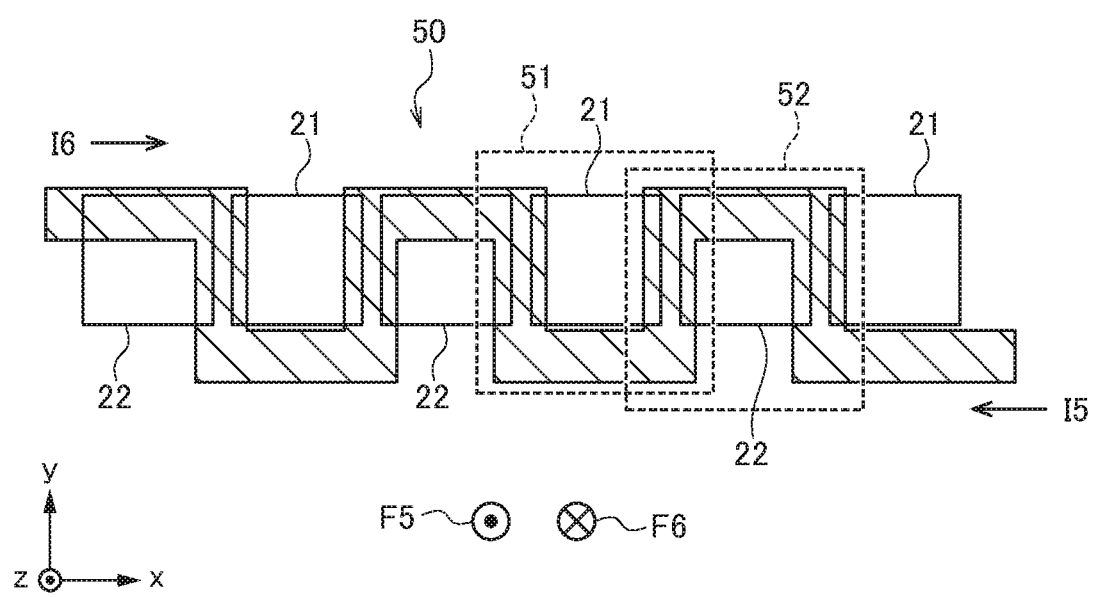
FIG. 11 is a diagram for explaining influence that current flowing in the third wiring 50 has on the magnet structure 20.

FIG. 11 is a diagram for explaining influence that current flowing in the third wiring 50 has on the magnet structure 20.

When a current I5 or I6 flows in the third wiring 50, a magnetic flux penetrating a region surrounded by each of the fifth wiring part 51 and sixth wiring part 52 in the z-direction is generated.

Specifically, when the current I5 flows in the third wiring 50, a magnetic flux is generated in the negative z-direction in the region surrounded by the fifth wiring part 51, whereas a magnetic flux is generated in the positive z-direction in the region surrounded by the sixth wiring part 52. Since the fifth wiring part 51 is provided so as to circle around the first magnet 21 in a plan view, it is attracted to the first magnet 21, that is, an upward (positive z-direction) attractive force F5 acts on the third wiring 50. On the other hand, since the sixth wiring part 52 is provided so as to circle around the second magnet 22 in a plan view, it is attracted to the second magnet 22, that is, an upward (positive z-direction) attractive force F5 acts on the third wiring 50. Thus, the upward (positive z-direction) attractive force F5 acts on the third wiring 50 with respect to both the first and second magnets 21 and 22.

On the other hand, when the current I6 flows in the third wiring 50, a magnetic flux is generated in the positive z-direction in the region surrounded by the fifth wiring part 51, whereas a magnetic flux is generated in the negative z-direction in the region surrounded by the sixth wiring part 52. Since the fifth wiring part 51 is provided so as to circle around the first magnet 21 in a plan view, it repels the magnetic flux from the first magnet 21, that is, a downward (negative z-direction) repulsive force F6 acts on the third wiring 50. On the other hand, since the sixth wiring part 52 is provided so as to circle around the second magnet 22 in a plan view, it repels the magnetic flux from the second magnet 22, that is, a upward (positive z-direction) repulsive force F6 acts on the third wiring 50. Thus, the upward (positive z-direction) repulsive force F6 acts on the third wiring 50 with respect to both the first and second magnets 21 and 22.

Thus, by making the current I5 or I6 flow in the third wiring 50, it is possible to change the relative positional relationship between the magnet structure 20 and the third wiring 50 in the z-direction. The speed of the positional change can be controlled by the magnitude of the current I5 or I6.

The first to third wirings 30 to 50 are formed on the circuit board 60, so that it is possible to change the planar positional relationship between the magnet structure 20 and the circuit board 60 by the currents I1 to I4 and further to change the distance between the magnet structure 20 and circuit board 60 by the currents I5 and I6. Thus, when the circuit board 60 is fixed to a predetermined casing, the magnet structure 20 can be three-dimensionally driven by the currents I1 to I6. On the other hand, when the magnet structure 20 is fixed to a predetermined casing, the circuit board 60 can be three-dimensionally driven by the currents I1 to I6.

Although not particularly limited, the actuator 10B according to the present embodiment can be used as an actuator for shake correction and auto-focus function of a camera incorporated in a smartphone. In this case, one of the magnet structure 20 and the circuit board 60 is fixed to the casing of the smartphone, the other one thereof is fixed to an optical lens of the camera, a camera shake signal is converted into the currents I1 to I4, and a focus signal is converted into the currents I5 and I6. With this configuration, the camera shake correction can be achieved, and the optical lens can be driven depending on a focused point to thereby allow achievement of the auto-focus function.

Third Embodiment

Figure 12:
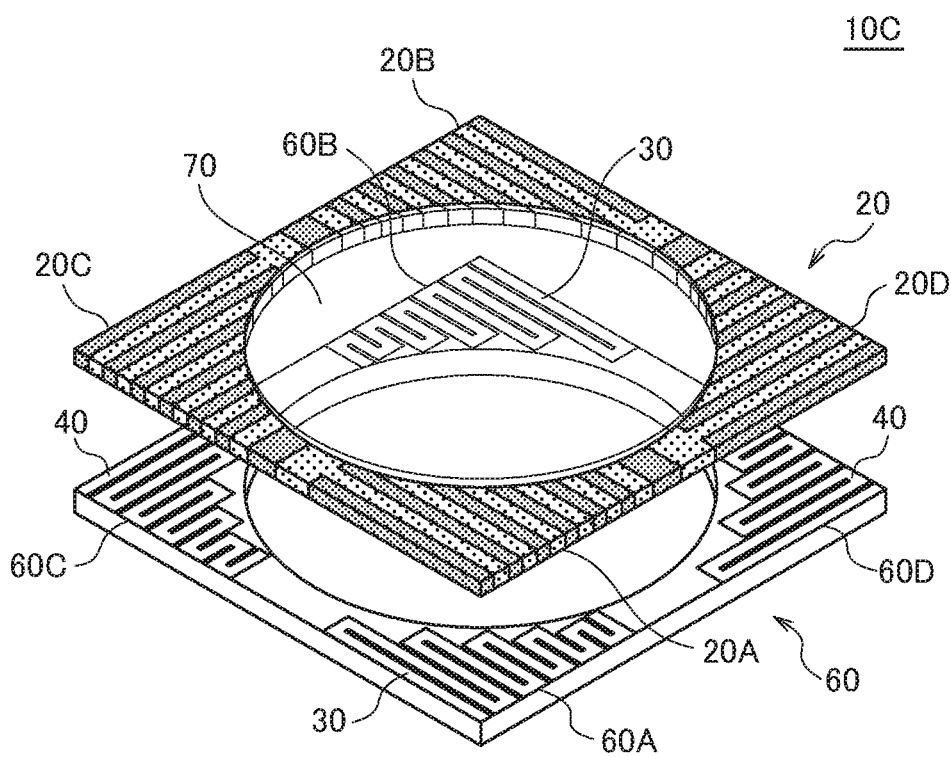
FIG. 12 is a schematic perspective view illustrating the configuration of the main part of an actuator 10C according to a third embodiment of the present invention.

FIG. 12 is a schematic perspective view illustrating the configuration of the main part of an actuator 10C according to the third embodiment of the present invention.

Figure 13:
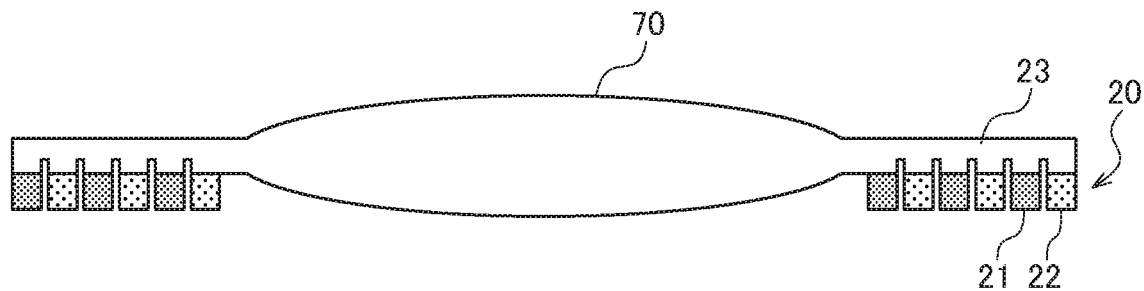
FIG. 13 is a schematic diagram indicating an example a part of glass constituting the support substrate 23 is used as the optical lens 70.

As illustrated in FIG. 12, the actuator 10C according to the present embodiment has a shape in which the center portions of the magnet structure 20 and the circuit board 60 are each hollowed out in a circle, and an optical lens is fitted into the center portion of the magnet structure 20. In this case, the circuit board 60 is fixed to a casing (not shown). The magnet structure 20 and the optical lens 70 may be fixed to each other by an adhesive. Alternatively, as illustrated in FIG. 13, the magnet structure 20 and the optical lens 70 may be integrated with each other in such a manner that a part of glass constituting the support substrate 23 is used as the optical lens 70.

In the present embodiment, the first and second wirings 30 and 40 are formed at different planar positions on the circuit board 60 to constitute the same plane. Specifically, a meandering first wiring 30 is formed in regions 60A and 60B on the circuit board 60, and a meandering second wiring 40 is formed in regions 60C and 60D on the circuit board 60.

In regions 20A and 20B of the magnet structure 20 overlapping the respective regions 60A and 60B of the circuit board 60, the first and second magnets 21 and 22 are alternately arranged in the x-direction to constitute the first array Lx. On the other hand, in regions 20C and 20D of the magnet structure 20 overlapping the respective regions 60C and 60D of the circuit board 60, the first and second magnets 21 and 22 are alternately arranged in the y-direction to constitute the second array Ly.

Thus, like the actuator 10A according to the first embodiment, the actuator 10C according to the present embodiment can control the two-dimensional positional relationship of the optical lens 70 with respect to the circuit board 60 by making the currents I1 to I4 flow in the first and second wirings 30 and 40. That is, the actuator 10C functions as a camera shake correction actuator.

As described above, in the present invention, the first and second wirings 30 and 40 need not necessarily overlap each other in the z-direction and may constitute the same plane. In this case, a wiring layer to be formed on the circuit board 60 can be made into a single-layer structure, allowing reduction in manufacturing cost of the circuit board 60.

Although the optical lens 70 is fitted into the center portion of the magnet structure 20 in the example of FIG. 12, it may be fitted into the center portion of the circuit board 60. In this case, the magnet structure 20 may be fixed to a casing (not shown). Alternatively, the optical lenses 70 may be fitted into the center portions of both the magnet structure 20 and circuit board 60, respectively.

It is apparent that the present invention is not limited to the above embodiments, but may be modified and changed without departing from the scope and spirit of the invention.

For example, in the above embodiments, the first and second wirings 30 and 40 are allocated to all the first and second magnets 21 and 22; however, such a configuration is not essential in the present invention. Thus, the first wiring 30 only needs to cross in the y-direction at least some of the first and second magnets 21 and 22 constituting the first array Lx, and the second wiring 40 only needs to cross in the x-direction at least some of the first and second magnets 21 and 22 constituting the second array Ly. Similarly, the third wiring 50 only needs to circle around some of the first and second magnets 21 and 22.

REFERENCE SIGNS LIST 10A-10C actuator
20 magnet structure
20A-20D region
20a bulky magnet
21 first magnet
22 second magnet
23 support substrate
24 laser beam
30 first wiring
30a one end of first wiring
30b other end of first wiring
31 first wiring part
32 second wiring part
33 connecting part
40 second wiring
40a one end of second wiring
40b other end of second wiring
41 third wiring part
42 fourth wiring part
43 connecting part
50 third wiring
50a one end of third wiring
50b other end of third wiring
51 fifth wiring part
52 sixth wiring part
60 circuit board
60A-60D region
61-63 insulating film
70 optical lens
F1-F4 Lorentz force
F5 attractive force
F6 repulsive force
I1-I6 current
Lx first array
Ly second array
S1 first plane
S2 second plane
S3 third plane
S4 fourth plane
SL slit

What is claimed is:
1. An actuator comprising:
a magnet structure including a plurality of first magnets each having an N-pole magnetic pole face positioned at a first plane extending in a first direction and a second direction perpendicular to the first direction and a plurality of second magnets each having an S-pole magnetic pole face positioned at the first plane;
a support substrate supporting the magnet structure;
a first wiring formed into a meander shape on a second plane parallel to the first plane, the first wiring including a plurality of first meander lines extending in the first direction and arranged in the second direction, and
a second wiring formed into a meander shape on a third plane parallel to the first plane, the second wiring including a plurality of second meander lines extending in the second direction and arranged in the first direction,
wherein each of the plurality of first meander lines and each of the plurality of second meander lines cross on an associated one of the first magnets or an associated one of the second magnets,
wherein the magnet structure includes a first array in which the first and second magnets are alternately arranged in the first direction and a second array in which the first and second magnets are alternately arranged in the second direction,
wherein the first wiring includes a first wiring part that crosses the first magnets in the first array in the second direction and a second wiring part that crosses the second magnets in the first array in the second direction, the first and second wiring parts being configured to flow current in opposite directions,
wherein the second wiring includes a third wiring part that crosses the first magnets in the second array in the first direction and a fourth wiring part that crosses the second magnets in the second array in the first direction, the third and fourth wiring parts being configured to flow current in opposite directions, and
wherein a thermal diffusivity of the support substrate is lower than that of the magnet structure.

2. The actuator as claimed in claim 1, further comprising an optical lens and a circuit board supporting the first and second wirings,
wherein the optical lens is fixed to one of the circuit board and magnet structure.

3. An actuator comprising:
a magnet structure having a plurality of magnets each having a magnetic pole face on a first flat plane, wherein the plurality of magnets include first, second, third, and fourth magnets, wherein the first and second magnets are adjacent to each other in a first direction, wherein the third and fourth magnets are adjacent to each other in the first direction, wherein the first and fourth magnets are adjacent to each other in a second direction perpendicular to the first direction, wherein the second and third magnets are adjacent to each other in the second direction, wherein the magnetic pole face of each of the first and third magnets on the first flat plane is an N-pole, and wherein the magnetic pole face of each of the second and fourth magnets on the first flat plane is an S-pole;
a first wiring including first, second, third, and fourth sections, wherein the first, second, third, and fourth sections of the first wirings cross the first, second, third, and fourth magnets in the first direction, respectively, and wherein the first and third sections of the first wiring and the second and fourth sections of the first wiring are configured to flow current in opposite directions; and
a second wiring including first, second, third, and fourth sections, wherein the first, second, third, and fourth sections of the second wirings cross the first, second, third, and fourth magnets in the second direction, respectively, and wherein the first and third sections of the second wiring and the second and fourth sections of the second wiring are configured to flow current in opposite directions.

4. The actuator as claimed in claim 3,
wherein the plurality of magnets further includes fifth and sixth magnets arranged in the second direction,
wherein the second and fifth magnets are adjacent to each other in the first direction such that the second magnet is arranged between the first and fifth magnets in the first direction,
wherein the third and sixth magnets are adjacent to each other in the first direction such that the third magnet is arranged between the fourth and sixth magnets in the first direction,
wherein the magnetic pole face of the fifth magnet on the first flat plane is an N-pole,
wherein the magnetic pole face of the sixth magnet on the first flat plane is an S-pole,
wherein the first wiring further includes fifth and sixth sections that cross the fifth and sixth magnets in the first direction, respectively,
wherein the first, third, and fifth sections of the first wiring and the second, fourth, and sixth sections of the first wiring are configured to flow current in opposite directions,
wherein the second wiring further includes fifth and sixth sections that cross the fifth and sixth magnets in the second direction, respectively, and
wherein the first, third, and fifth sections of the second wiring and the second, fourth, and sixth sections of the second wiring are configured to flow current in opposite directions.

5. The actuator as claimed in claim 4,
wherein the plurality of magnets further includes seventh, eighth and ninth magnets arranged in the first direction such that the eighth magnet is arranged between the seventh and ninth magnets in the first direction,
wherein the fourth and seventh magnets are adjacent to each other in the second direction such that the fourth magnet is arranged between the first and seventh magnets in the second direction,
wherein the third and eighth magnets are adjacent to each other in the second direction such that the third magnet is arranged between the second and eighth magnets in the second direction,
wherein the sixth and ninth magnets are adjacent to each other in the second direction such that the sixth magnet is arranged between the fifth and ninth magnets in the second direction,
wherein the magnetic pole face of each of the seventh and ninth magnets on the first flat plane is an N-pole,
wherein the magnetic pole face of the eighth magnet on the first flat plane is an S-pole,
wherein the first wiring further includes seventh, eighth and ninth sections that cross the seventh, eighth and ninth magnets in the first direction, respectively,
wherein the first, third, fifth, seventh, and ninth sections of the first wiring and the second, fourth, sixth, and eighth sections of the first wiring are configured to flow current in opposite directions, wherein the second wiring further includes seventh, eighth and ninth sections that cross the seventh, eighth and ninth magnets in the second direction, respectively, and wherein the first, third, fifth, seventh, and ninth sections of the second wiring and the second, fourth, sixth, and eighth sections of the second wiring are configured to flow current in opposite directions.

6. The actuator as claimed in claim 5, wherein the first, fourth, and seventh sections of the first wiring constitute a first meander-shaped line extending in the second direction, wherein the second, third, and eighth sections of the first wiring constitute a second meander-shaped line extending in the second direction, wherein the fifth, sixth, and ninth sections of the first wiring constitute a third meander-shaped line extending in the second direction, wherein the first, second, and fifth sections of the second wiring constitute a fourth meander-shaped line extending in the first direction, wherein the fourth, third, and sixth sections of the second wiring constitute a fifth meander-shaped line extending in the first direction, wherein the seventh, eighth, and ninth sections of the second wiring constitute a sixth meander-shaped line extending in the first direction, wherein the first, second, and third meander-shaped lines are arranged in the first direction, and wherein the fourth, fifth, and sixth meander-shaped lines are arranged in the second direction.

7. The actuator as claimed in claim 6, wherein the second meander-shaped line is connected between the first and third meander-shaped lines, and wherein the fifth meander-shaped line is connected between the fourth and sixth meander-shaped lines.

8. The actuator as claimed in claim 7, wherein the first wiring further includes tenth and eleventh sections extending in the second direction, wherein each of the second and third sections of the first wiring having a first end in the first direction, wherein each of the third and eighth sections of the first wiring having a second end in the first direction, wherein the tenth section of the first wiring is connected between the first end of the second section of the first wiring and the first end of the third section of the first wiring, and wherein the eleventh section of the first wiring is connected between the second end of the third section of the first wiring and the second end of the eighth section of the first wiring.

9. The actuator as claimed in claim 8, wherein the tenth section of the first wiring overlaps each of the second and third sections of the first wiring.

10. The actuator as claimed in claim 9, wherein the eleventh section of the first wiring overlaps each of the third and eighth sections of the first wiring.

11. The actuator as claimed in claim 10, wherein the second wiring further includes tenth and eleventh sections extending in the first direction, wherein each of the third and fourth sections of the second wiring having a third end in the second direction, wherein each of the third and sixth sections of the second wiring having a fourth end in the second direction, wherein the tenth section of the second wiring is connected between the third end of the third section of the second wiring and the third end of the fourth section of the second wiring, and wherein the eleventh section of the second wiring is connected between the fourth end of the third section of the second wiring and the fourth end of the sixth section of the second wiring.

12. The actuator as claimed in claim 11, wherein the tenth section of the second wiring overlaps each of the third and fourth sections of the second wiring.

13. The actuator as claimed in claim 12, wherein the eleventh section of the second wiring overlaps each of the third and sixth sections of the second wiring.

14. An actuator comprising:

a magnet structure having a plurality of magnets each having a magnetic pole face on a first flat plane, wherein the plurality of magnets include first, second, third, fourth, and fifth magnets, wherein the first, second, and third magnets are arranged in a first direction such that the second magnet is arranged between the first and third magnets in the first direction, wherein the second, fourth, and fifth magnets are arranged in a second direction perpendicular to the first direction such that the second magnet is arranged between the fourth and fifth magnets in the second direction, wherein the magnetic pole face of the second magnet on the first flat plane is an N-pole, and wherein the magnetic pole face of each of the first, third, fourth, and fifth magnets on the first flat plane is an S-pole;

a first wiring including first, second, and third sections extending in the second direction and fourth and fifth sections extending in the first direction, wherein the first, second, and third sections of the first wirings overlap the first, second, and third magnets, respectively, wherein each of the first and second sections of the first wiring having a first end in the second direction, wherein each of the second and third sections of the first wiring having a second end in the second direction, wherein the fourth section of the first wiring is connected between the first end of the first section of the first wiring and the first end of the second section of the first wiring, and wherein the fifth section of the first wiring is connected between the second end of the second section of the first wiring and the second end of the third section of the first wiring; and a second wiring including first, second, and third sections extending in the first direction and fourth and fifth sections extending in the second direction, wherein the first, second, and third sections of the second wirings overlap the fourth, second, and fifth magnets, respectively, wherein each of the first and second sections of the second wiring having a third end in the first direction, wherein each of the second and third sections of the second wiring having a fourth end in the first direction, wherein the fourth section of the second wiring is connected between the third end of the first section of the second wiring and the third end of the second section of the second wiring, and wherein the fifth section of the second wiring is connected between the fourth end of the second section of the second wiring and the fourth end of the third section of the second wiring.

15. The actuator as claimed in claim 14, wherein the second section of the first wiring and the second section of the second wiring cross each other on the second magnet.

16. The actuator as claimed in claim 15,
wherein the fourth section of the first wiring and the fourth section of the second wiring cross each other on the second magnet, and
wherein the fifth section of the first wiring and the fifth section of the second wiring cross each other on the second magnet.

* * * * *